UNITED STATES PATENT OFFICE.

OMAR T. JOSLIN, OF CHICAGO, ILLINOIS.

PROCESS OF MAKING FERTILIZER FROM TANK-WATER.

SPECIFICATION forming part of Letters Patent No. 489,010, dated January 3, 1893.

Application filed September 28, 1891. Serial No. 407,003. (Specimens.)

*To all whom it may concern:*

Be it known that I, OMAR T. JOSLIN, a citizen of the United States, residing at Chicago, in the county of Cook and State of Illinois, have invented a certain new and Improved Process of Treating Tank-Waters, of which the following is a full, clear, and exact description.

My invention relates to processes of treating the refuse waters of slaughter-houses, commonly called tank waters, to render them fit for use as fertilizers. As is well known, tank waters are very rich in nitrogenous compounds, and it is very desirable that these compounds should be recovered for use as fertilizers. The great impediment to their recovery in a state fit for such use has been that they are very hygroscopic, and unless this property can be eliminated they are not marketable, as they will readily absorb moisture from the air and soon become so moist that they cannot be transported or stored, and are therefore of little value. Various processes have been invented for recovering these nitrogenous compounds and rendering them non-deliquescent; but such processes have generally involved the loss of a large proportion of the ammoniates, which constitute the principal valuable constituent of the tank waters, and consequently the value of the product is greatly lessened.

The objects of my invention are to provide a new and improved process for treating tank waters, in which only a small percentage of the ammoniates will be lost, and which will be simple and inexpensive. I accomplish these objects by treating the waters in the following manner. After the tank water has been produced in the usual manner, it is evaporated to a sirupy condition, containing from about thirty to forty per cent. of water. Into this sirup is added from five to ten per cent. of its weight of sulphuric acid or muriatic acid. Before adding the acid the sirup is preferably heated to a temperature of from 140° to 200° Fahrenheit. By adding the acid as above described, a precipitate is formed, and the constitution of the original sirup is altered. The complex nature of the tank waters renders it somewhat difficult to determine the exact nature of the precipitate, but it consists of certain albuminous constituents of the tank water which are insoluble in the supernatant sirup. Instead of using sulphuric or muriatic acid to cause the above mentioned precipitate, acid phosphates or acid sulphates may be used, as their action is similar. To the product thus formed is now added from five to twenty per cent. of a concentrated solution of a sulphate of magnesium, manganese or zinc, either of which solutions forms a menstruum in which certain other of the albuminous constituents of the sirup are insoluble, and in consequence a further precipitation takes place, leaving a clear, slightly colored saline liquid, from which nearly all the albuminous constituents have been removed. Certain peptones or other allied products are still held in solution. To absorb the above mentioned saline liquid, and to render the entire mass more or less solid, from twenty to forty per cent. of dried or dampened ground tankage, hoofs, horns, or pressed cooked blood is now added, which absorbs the saline liquid and renders the mass sufficiently solid to permit of its being handled. In order to cause the greatest possible precipitation in each of the above processes, the materials are thoroughly mixed, so that the different constituents will be thoroughly incorporated with each other. The product resulting after the dried tankage, hoofs, horns, or cooked blood has been added, is then placed in shallow pans and dried in suitable ovens, at a temperature of from 300° to 400° Fahrenheit, which drying renders the materials almost perfectly anhydrous and hastens the evaporation.

In order to prepare the product for transportation, storage, or other purposes to which it is intended to apply it, it is taken from the ovens, and after cooling, is ground to a powder. It will generally be found that one or more of the above mentioned operations will be sufficient to produce a material whose hygroscopic power is sufficiently small to allow of its commercial use as a high-grade ammoniate. Certain tank waters have however been found to be much more hygroscopic than others, and to treat them most successfully it has been found that a further operation is necessary, which operation is as follows: After the ground and dried product has been formed, as above specified, it is placed in a suitable receptacle and there is subjected to a temperature of from 300° to 400° Fahrenheit, the product being constantly stirred or kept in motion while it is exposed to the heat. The material is exposed to the above mentioned degree of heat for from fifteen minutes to one hour, when it will be found that each particle of the product is far more insoluble and hence more non-deliquescent than before. In heating the product, as above described, I prefer to use steam heat, but other methods of heating may be used if desired. During the process of heating, large quantities of the ammonia contained in the product would be driven off were it not for the presence of the magnesium, manganese or zinc salts, which are good absorbents of ammonia, and therefore prevent its escape during the process of heating. After the product has been removed from the receptacle in which it has been heated, it is ready to be packed in sacks or barrels, and may then be readily stored or transported, as the property of absorbing moisture will have been almost entirely eliminated.

There is an important advantage attained by adding the acid to the tank water after concentration, in that it is impracticable to concentrate the water after precipitation, as the precipitate would settle on the tubes and on the bottom of the evaporating vessel, where it would cake and ultimately burn, and require to be scraped off and thrown away. This would involve a loss, and by reason of the coating of the pipes of the heating apparatus it would be impossible to evaporate economically. As the original water contains as high as seven per cent. (maximum), and frequently as low as two per cent. of solids, and the concentrated water contains seventy per cent. solids, the precipitation cannot be made so complete before concentration as after. Again, in the concentrated water there is a thick sirupy liquid which holds the precipitate in suspension, and the precipitation is complete in a very short time. The precipitation after concentration secures a much more complete precipitation, a better product with less waste, and is in general more economical. By the employment of either of the three reagents of the sulphates of magnesium, manganese and zinc, the amount of non-nitrogenous matter introduced is much less, and the percentage of nitrogenous matter correspondingly increased. The magnesium has a beneficial effect as it is not inert, but acts to a certain extent as a fertilizer.

That which I claim as new and desire to secure by Letters Patent, is,—

1. The process of treating tank waters to recover certain albuminous constituents, which consists in first evaporating the tank waters to a sirupy condition, then heating the sirup to a temperature of from 140° to 200° Fahrenheit, then adding a small percentage of sulphuric acid, and then drying the product, substantially as described.

2. The process of treating tank waters, which consists in first evaporating the water to a sirupy condition, then adding a small percentage of sulphuric acid, then adding from five to twenty per cent. of sulphate of magnesium, and then drying the product, substantially as described.

3. The process of treating tank waters, which consists in evaporating the waters to a sirupy condition, adding a small percentage of sulphuric acid, then adding from five to twenty per cent. of sulphate of magnesium, then adding an absorbent of the supernatant liquid, and then drying the product, substantially as described.

4. The process of treating tank waters, which consists in evaporating the water to a sirupy condition, then adding sulphuric acid, then adding sulphate of magnesium, then adding an absorbent of the supernatant liquid, and then drying the product at a temperature of from 300° to 400° Fahrenheit, substantially as described.

5. The process of treating tank waters, which consists in evaporating the water to a sirupy condition, then adding to the solution a small percentage of sulphuric acid, drying and grinding the product, and then subjecting it, when in motion, to the action of a heat of from 300° to 400° Fahrenheit, for from fifteen minutes to an hour, substantially as described.

6. The process of treating tank waters which consists in precipitating the albuminous constituents of the water by suitable reagents, then drying and grinding the product, and then subjecting it, while in motion, to a temperature of from 300° to 400° Fahrenheit, for from fifteen minutes to an hour, substantially as described.

OMAR T. JOSLIN.

Witnesses:
JOHN L. JACKSON,
A. H. ADAMS.